F. C. DECKEBACH, Dec'd.
C. DECKEBACH, Adm'x.
Beer-Cooler.
No. 210,016. Patented Nov. 19, 1878.
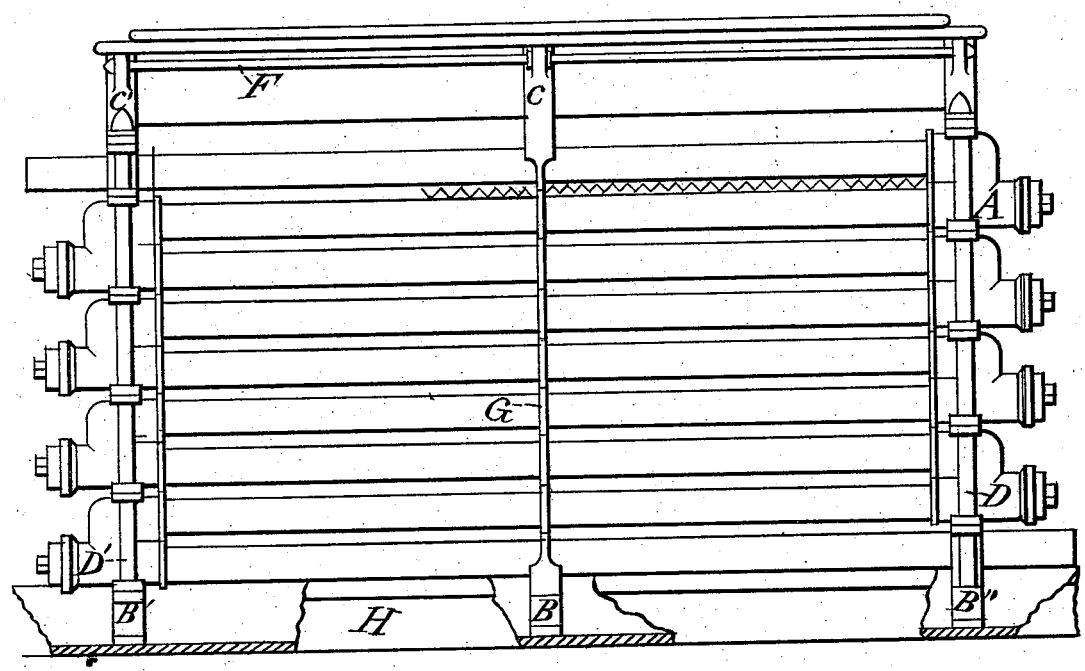
Fig. 1.
Fig. 2.
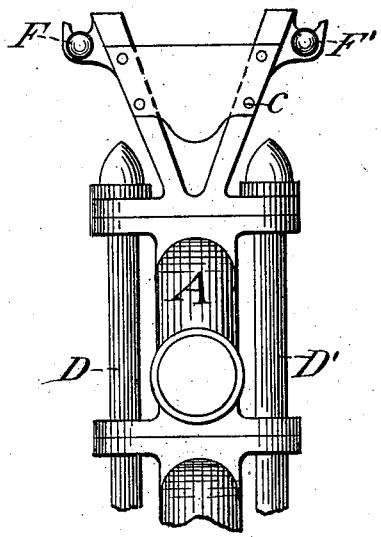
Fig. 3.
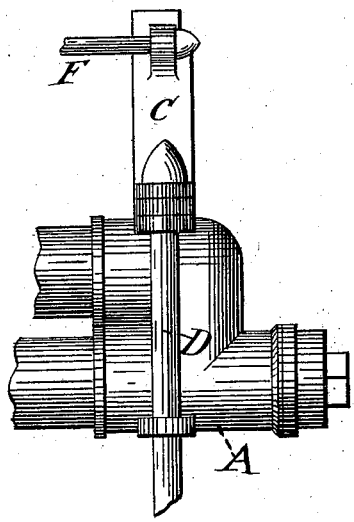
Witnesses:
A. Potter.
Chas. H. Schmitt.
Inventor:
C. Deckebach
Adm'x of F. C. Deckebach dec'd
By J. A. Hurdle
Att'y.

UNITED STATES PATENT OFFICE.

CAROLINE DECKEBACH, OF CINCINNATI, OHIO, ADMINISTRATRIX OF FREDERICK C. DECKEBACH, DECEASED.

IMPROVEMENT IN BEER-COOLERS.

Specification forming part of Letters Patent No. 210,016, dated November 19, 1878; application filed July 25, 1878.

*To all whom it may concern:*

Be it known that I, F. C. DECKEBACH, of the city of Cincinnati, Hamilton county, State of Ohio, have invented a new and useful Improvement in Beer - Cooling Apparatus, which improvement is fully set forth in the following specification and accompanying drawings, in which—

Figure 1 is a side elevation of my beer-cooler. Fig. 2 represents an enlarged view of trough and elbow. Fig. 3 represents an enlarged side view of trough and elbow.

The object of my invention is to strengthen and stiffen beer-coolers, in order that the beer may run even along the pipes.

My invention consists of a beer-cooler with elbows provided with projections on their upper and lower sides. The elbows are provided with projections on their upper and lower sides, and are placed one above the other in order that the projections may rest upon each other. The projections of the elbows are provided with an opening, through which upright rods pass from the bottom to the top, passing through the projection on the base of the V-support for the trough. The upright rods are provided with screw-heads at each end for tightening. There are also horizontal rods, which extend from the center to each end. They are also provided with screw-heads for tightening, in order to brace the upright.

The center is provided with an upright, which supports the horizontal pipes and troughs, and is provided with a support at the bottom.

In the drawing, A represents the elbow, with projections on its upper and lower sides, with an opening for the upright rods D D' to pass through.

B, B', and B'' are supports, made of any material desired. C and C' is a combined support for trough and horizontal pipes with a bottom support.

D D' are upright rods passing through the opening of the projections of the elbows A.

C represents the V-shaped support for trough, fastened to the projection of the elbow. F are horizontal rods, passing from right to left, and are held fast by screw-heads at each end, which are used to tighten the same.

Having thus described my invention, what I claim as new, and desire to secure by Letters Patent, is—

In a beer-cooler, the elbows A, provided with projections on their upper and lower sides, through holes in which rods D D' pass, in combination with said rods D D', supports B B', rods F F', and trough-support C C', substantially as shown and described.

F. C. DECKEBACH,
Per CAROLINE DECKEBACH,
*Administratrix.*

Witnesses:
CHAS. H. SCHMITT,
S. A. POTTER.